H. C. GARDNER.
APPARATUS FOR CONDENSING AMMONIA FROM A GASEOUS TO A LIQUID STATE.
APPLICATION FILED NOV. 13, 1913.
1,129,477. Patented Feb. 23, 1915.
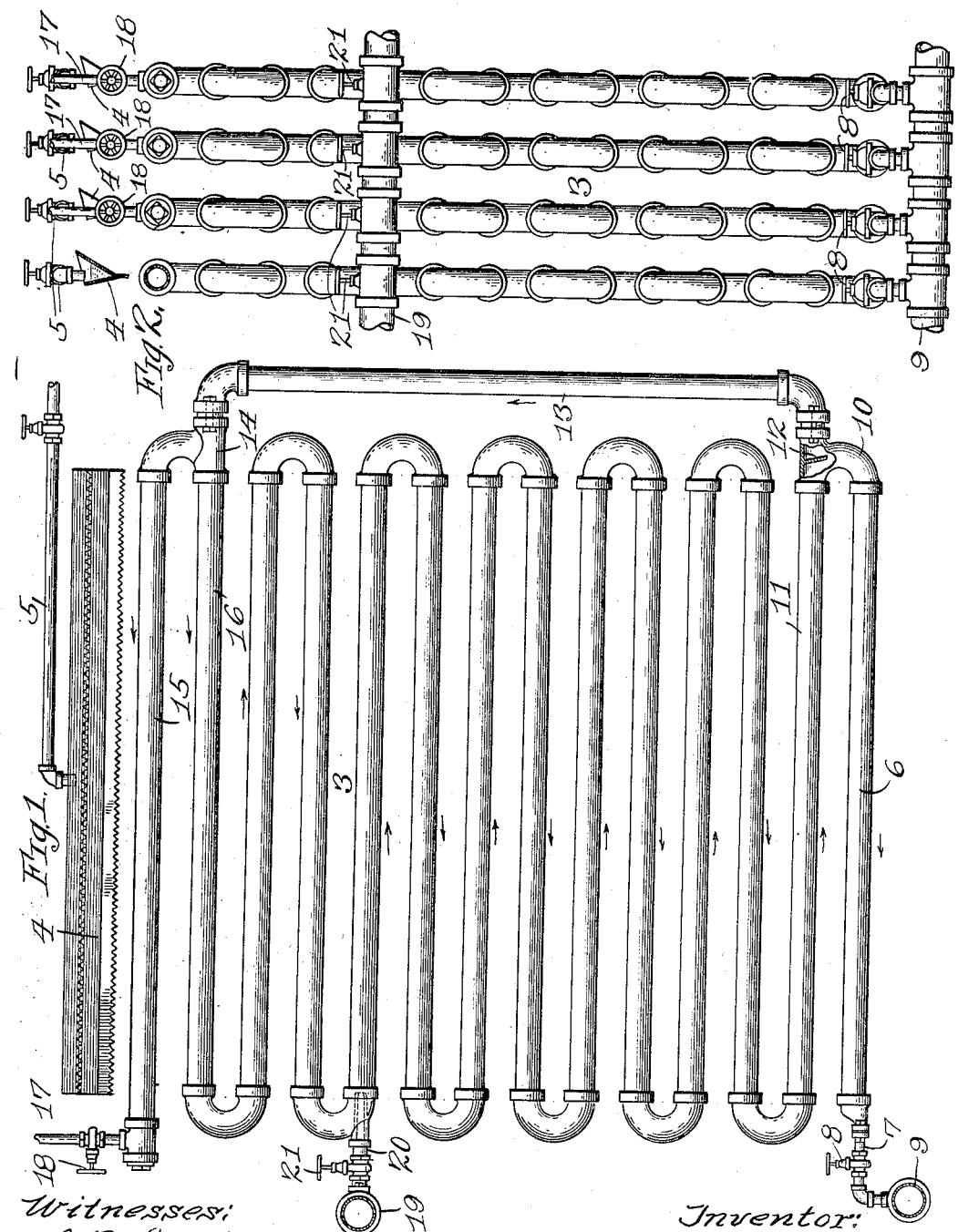

UNITED STATES PATENT OFFICE.

HORACE C. GARDNER, OF CHICAGO, ILLINOIS.

APPARATUS FOR CONDENSING AMMONIA FROM A GASEOUS TO A LIQUID STATE.

1,129,477.
Specification of Letters Patent. Patented Feb. 23, 1915.

Application filed November 13, 1913. Serial No. 800,810.

*To all whom it may concern:*

Be it known that I, HORACE C. GARDNER, a citizen of the United States, residing at Chicago, in the county of Cook and State of Illinois, have invented certain new and useful Improvements in Apparatus for Condensing Ammonia from a Gaseous to a Liquid State, of which the following is a specification, reference being had to the accompanying drawings.

My invention relates to the condensation of ammonia gas and analogous substances to reduce them from a gaseous to a liquid state by cooling.

It has for its object to provide a new and improved continuously operating apparatus by the use of which such gases may be quickly and economically liquefied.

My improved apparatus provides for the maintenance of a rapid circulation of the gases to be condensed while exposed to a cooling medium, and at the same time for the intermingling of the incoming uncondensed gases with a portion of the liquid resulting from condensation, in such manner as to take advantage of the fact that such liquid takes up the sensible heat of the hot gases, thereby equalizing the pressure in the condensing apparatus and promoting liquefaction. In the operation of the apparatus the uncondensed gases are subjected to the action of a cooling medium so as to effect condensation thereof to a greater or less extent, the uncondensed gases being then separated from the resulting liquid, the liquid being allowed to pass out of the apparatus while the separated gases are further cooled and partly liquefied and then intermingled with the incoming gases. By this procedure the incoming hot gases are mixed with a relatively large volume of previously cooled gases and also with a portion of the liquid resulting from condensation, so that a rapid circulation of the gases while they are subjected to the action of the cooling medium is maintained, and the liquid takes up the sensible heat of the incoming gases and promotes its transfer to the metal of the cooling apparatus, thereby increasing the condensing effect of such cooling apparatus. The pressure in the apparatus is also equalized, thereby facilitating the circulation of the gases and liquid through it. The upward flow of the separated gases from the point of their separation to the top of the coil is effected by suction caused principally by injecting the incoming gases through a nozzle and to a lesser extent by the condensation of a portion of such separated gases in the upper portion of the coil. The gases during their upward flow are free from liquid, thus avoiding trouble incident to carrying liquid against the force of gravity. By the liquefaction of a portion of the separated gases in the upper portion of the coil enough liquid is accumulated so that upon reaching the point of injection where the incoming hot gases are introduced the liquid then present immediately reëvaporates to an extent necessary to balance the superheat above the liquefaction temperature of the incoming hot gases and maintains a relatively uniform temperature and lower average pressure through the coil.

In the accompanying drawings, in which I have illustrated my improved apparatus,—Figure 1 is a side elevation, some of the parts being in section; and Fig. 2 is an end view.

Referring to the drawings,—3 indicates a coil composed of a number of pipes connected in series so as to form a circuitous line of pipe, arranged in substantially the same vertical plane below a suitable source of water supply, such as a distributing trough 4, arranged to furnish a continuous flow of cold water over the several pipes. In the drawings I have shown a series of troughs, arranged to overflow on one side, so as to discharge water over the coil, but any other suitable apparatus for the purpose may be employed. In the construction illustrated I have shown four coils arranged parallel with each other, each supplied by a separate trough, the several troughs being supplied with water through pipes 5. It will be understood that any desired number of coils may be employed. The lowermost pipe 6 of each coil is connected by an outlet pipe 7, having a valve 8, with a liquid discharge pipe 9, so that the liquid as formed may be withdrawn. 10 indicates a bend, connecting the bottom pipe 6 with the next higher pipe 11 of the series, said bend being provided with a downwardly-extending web or partition 12, which serves to direct the liquid formed in the coil down into the pipe 6, while permitting any uncondensed gases to pass up through a riser 13, which connects with the bend 10, adjacent to the partition 12, as shown in Fig. 1. The liquid received by the pipe 6 is further exposed to the condensing action of the cooling water, as said pipe extends under the main body of the coil before reaching the outlet 7, so that the cooling water flows over it; thus the separated liquid is delivered at a comparatively low temperature. The riser 13 connects at its upper end with a branched bend 14, which in turn connects with the uppermost pipe 15 and with a pipe 16 immediately below it. The uppermost pipe 15 is intended to receive and conduct away any uncondensable gases, and to that end is provided with a discharge pipe 17, having a valve 18, as shown in Fig. 1. The pipe 16 receives the condensable gases delivered to it through the riser 13. By providing the pipe 15 above and communicating with the pipe 16 between the latter pipe and the riser 13, the uncondensable gases, mixed with a greater or less proportion of condensable gases, pass into and accumulate in said pipe 15 where they are further cooled by the cooling water, since said pipe extends under the trough 4, above the main body of the coil. Thus any condensable gases in the pipe 15 are condensed and the liquid produced flows down into the pipe 16 and thence down through the balance of the coil. This construction is advantageous in that it provides for the separation and cooling of the uncondensable gases and their accumulation in such manner that they may readily be blown out from time to time, as desired, by opening the valve 18, without interfering with the operation of the condenser as a whole.

19 indicates the supply pipe through which the gases to be condensed are delivered to the coil, said pipe having a series of injectors 20, one for each coil, each of which injectors is controlled by a valve 21. The several injectors open into their respective coils at a point a short distance below the uppermost member 16 of such coils, so that the hot gases are not introduced into the coils at the top, but at an intermediate point thereof, whereby a portion of the coil lies above the point of introduction of the gases, and a portion below such point. It will be observed that the cold water used for condensing purposes passes over that portion of the coil which lies above the injector before flowing over the remainder of the coil, so that the gases delivered by the riser 13 to the uppermost members of the coil are subjected to the coldest water, thus promoting their partial liquefaction. It will be noted also that the liquid formed in the uppermost members of the coil flows, with the gas stream, down to the point where they meet the incoming gases, and they are there intermingled with such gases, with the results previously mentioned. The gases are injected under pressure, which also applies suction to those members of the coil lying above the injector, and it is designed in practice to operate the apparatus in such manner that the volume of uncondensed gases drawn up through the riser 13 is equal to that injected, thus providing for a rapid circulation of the gases through the system, thereby greatly increasing the capacity and efficiency of the condenser.

That which I claim as my invention, and desire to secure by Letters Patent, is,—

1. An apparatus for condensing ammonia or other gas, comprising a suitable coil, means for cooling said coil, means for delivering incoming uncondensed gases intermediately to said coil, and means connecting together portions of said coil at opposite sides of the gas inlet, whereby the uncondensed gases in the lower portion of the coil will be separated from the liquid therein and conducted to the upper portion of the coil.

2. An apparatus for condensing ammonia or other gas, comprising a suitable coil, means for cooling said coil, means for injecting incoming uncondensed gases intermediately into said coil, and means connecting together portions of the coil at opposite sides of said injecting means, whereby partially condensed gases may be separated from the liquid formed, further cooled and partly liquefied, and then intermingled with the incoming gases.

3. An apparatus for condensing ammonia or other gas, comprising a suitable coil disposed substantially in a vertical plane, means for discharging a cooling liquid upon the upper portion of said coil, means connected intermediately with said coil for supplying incoming uncondensed gases thereto, and a pipe connecting the lower portion of the coil with the coil above said gas supplying means.

4. An apparatus for condensing ammonia or other gas, comprising a suitable coil, means for introducing incoming uncondensed gas into said coil, a liquid outlet pipe connected with the outlet end of the coil, means for cooling said coil and said liquid outlet pipe, and a pipe connecting the outlet end of the coil with the coil at the opposite side of the inlet.

5. An apparatus for condensing ammonia or other gas, comprising a suitable coil, means for introducing incoming gases into said coil intermediately, means connecting the outlet portion of the coil with the coil at the opposite side of the inlet, a pipe connected with the inlet portion of the coil for receiving the uncondensable gases, and means for cooling the coil and said pipe.

6. An apparatus for condensing ammonia or other gas, comprising a suitable coil disposed substantially in a vertical plane, means for discharging a cooling liquid thereupon, means for injecting incoming uncondensed gases intermediately into said coil, a pipe connecting the discharge end of said coil with the upper end portion thereof, and a pipe for receiving the uncondensable gases, connected with the upper end portion of the coil and extending under the cooling liquid discharging means.

7. An apparatus for condensing ammonia or other gas, comprising a suitable coil, means for introducing incoming uncondensed gas into said coil intermediately thereof, a liquid outlet pipe connected with the outlet end of the coil, a pipe connecting portions of said coil at opposite sides of the inlet, a pipe connected with said coil above the inlet for receiving uncondensable gases, and means for cooling said coil and the liquid outlet and uncondensable gas pipes.

8. An apparatus for condensing ammonia or other gas, comprising a suitable coil disposed substantially in a vertical plane, means for discharging a cooling liquid thereupon, means for injecting incoming uncondensed gases intermediately into said coil, a pipe connecting the discharge end of said coil with the upper end portion thereof, a pipe for receiving the uncondensable gases, connected with the upper end portion of the coil and extending under the cooling liquid discharging means, and a liquid outlet pipe connected with the discharge end portion of the coil and extending thereunder.

HORACE C. GARDNER.

Witnesses:
W. H. DE BUSK,
W. A. FURNNER.

Copies of this patent may be obtained for five cents each, by addressing the "Commissioner of Patents, Washington, D. C."